(12) United States Patent
Yonezawa et al.

(10) Patent No.: US 11,514,730 B2
(45) Date of Patent: Nov. 29, 2022

(54) HYBRID VEHICLE AND METHOD OF DIAGNOSING ABNORMAL CONDITION OF HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 16/797,694

(22) Filed: Feb. 21, 2020

(65) Prior Publication Data

US 2020/0294332 A1  Sep. 17, 2020

(30) Foreign Application Priority Data

Mar. 14, 2019 (JP) .............................. JP2019-047255

(51) Int. Cl.
*F02D 41/00* (2006.01)
*G07C 5/08* (2006.01)
(Continued)

(52) U.S. Cl.
CPC .............. *G07C 5/0808* (2013.01); *B60K 6/26* (2013.01); *B60K 6/365* (2013.01); *B60W 10/06* (2013.01); *B60W 10/08* (2013.01); *B60W 20/10* (2013.01); *F02B 37/183* (2013.01); *F02D 41/0007* (2013.01); *F02D 41/221* (2013.01);
(Continued)

(58) Field of Classification Search
CPC . F02D 41/0007; F02D 41/221; G07C 5/0808; B60K 6/26; B60K 6/365; B60W 10/06; B60W 10/08; B60W 20/10; F02B 37/183
See application file for complete search history.

(56) References Cited

U.S. PATENT DOCUMENTS 8,938,960 B2 * 1/2015 Moriguchi .......... F02D 41/1445
60/602
10,544,747 B2 * 1/2020 Dudar ................. F02D 41/0007
(Continued)

FOREIGN PATENT DOCUMENTS

JP       2015-058924 A    3/2015
JP       2018-192824 A   12/2018

*Primary Examiner* — Gonzalo Laguarda
(74) *Attorney, Agent, or Firm* — Sughrue Mion, PLLC

(57) ABSTRACT

In a hybrid vehicle, each of an engine and an MG1 is mechanically coupled to a drive wheel with a planetary gear being interposed. The planetary gear and an MG2 are configured such that motive power output from the planetary gear and motive power output from the MG2 are transmitted to the drive wheel as being combined. A controller makes WGV diagnosis for diagnosing whether or not a waste gate valve is normally controllable by issuing an instruction to a WGV actuator while the controller stops combustion in the engine and controls the MG1 and the MG2 in coordination to perform motoring of the engine during traveling of the hybrid vehicle.

6 Claims, 8 Drawing Sheets

(51) Int. Cl.
 *B60K 6/26* (2007.10)
 *B60K 6/365* (2007.10)
 *F02B 37/18* (2006.01)
 *B60W 20/10* (2016.01)
 *B60W 10/06* (2006.01)
 *F02D 41/22* (2006.01)
 *B60W 10/08* (2006.01)

(52) U.S. Cl.
 CPC ............... *B60W 2710/0644* (2013.01); *B60W 2710/083* (2013.01); *B60Y 2200/92* (2013.01); *B60Y 2400/435* (2013.01)

(56) References Cited

U.S. PATENT DOCUMENTS

| | | | |
|---|---|---|---|
| 10,544,748 B2* | 1/2020 | Dudar | F02D 29/02 |
| 10,605,161 B2* | 3/2020 | Banker | F02B 37/04 |
| 2019/0203630 A1* | 7/2019 | Dudar | B60W 50/0097 |
| 2020/0307369 A1* | 10/2020 | Yonezawa | B60K 6/24 |

\* cited by examiner

<<HV TRAVELING>>

<<EV TRAVELING>>

<<STOPPED>>

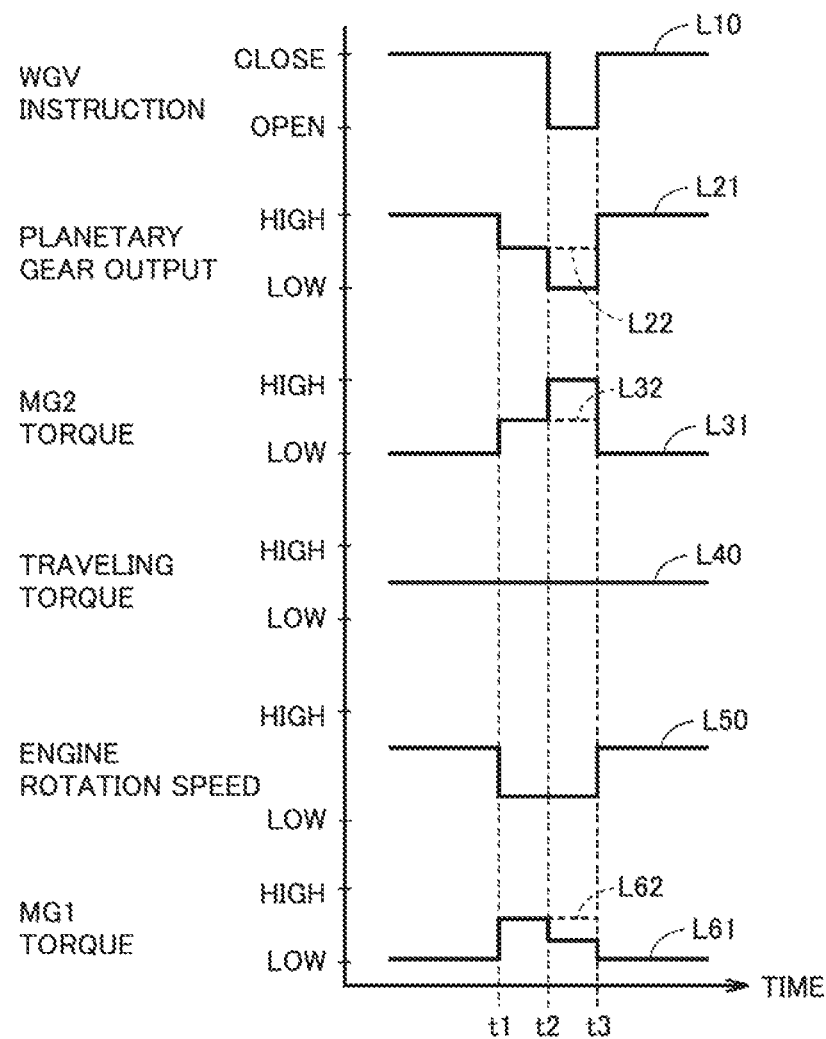

HYBRID VEHICLE AND METHOD OF DIAGNOSING ABNORMAL CONDITION OF HYBRID VEHICLE

This nonprovisional application is based on Japanese Patent Application No. 2019-047255 filed with the Japan Patent Office on Mar. 14, 2019, the entire contents of which are hereby incorporated by reference.

BACKGROUND

Field

The present disclosure relates to a hybrid vehicle and a method of diagnosing an abnormal condition of a hybrid vehicle.

Description of the Background Art

Japanese Patent Laying-Open No. 2018-192824 discloses a hybrid vehicle including an engine and a motor that output motive power to a drive wheel. The engine includes a turbocharger and a waste gate valve (which is also referred to as a "WGV" below). The WGV is provided in a bypass passage that allows exhaust to flow therethrough as bypassing a turbine of the turbocharger. As the WGV is closed, a flow rate of exhaust that flows into the turbine increases. Therefore, the WGV is closed when forced induction of the engine is performed. The WGV is opened when forced induction of the engine is not performed.

SUMMARY

A vehicle in recent years is mandated to incorporate an on board diagnostics (OBD) device that monitors the vehicle itself. The OBD device makes diagnosis as to an abnormal condition of various vehicle-mounted devices with a method in conformity with a prescribed OBD standard (for example, OBDII). When the OBD device finds an abnormal condition, it notifies a driver of occurrence of the abnormal condition.

A method of diagnosing an abnormal condition of a WGV in a hybrid vehicle has not yet been established, and diagnosis of the WGV is made also in the hybrid vehicles with a method similar to the method for a conventional vehicle. The conventional vehicle is a vehicle that uses only an engine as a source of motive power for traveling.

For example, in a conventional vehicle, when the vehicle travels while forced induction of the engine is being performed (that is, the WGV is closed), the OBD device issues an instruction to drive the WGV to open to a WGV actuator and determines whether or not the WGV has opened as instructed and whether or not a boost pressure has varied, based on an output from a boost pressure sensor. When the WGV has operated as instructed by the OBD device, diagnosis that the WGV can normally be controlled (that is, is not in an abnormal condition) is made.

With the method, however, a position of the WGV is varied and engine torque is varied during diagnosis. Therefore, traveling torque applied to a drive wheel of the vehicle may be varied during diagnosis and drivability of the vehicle may become poor. When an operation condition of the engine is determined only in consideration of drivability during diagnosis, a fuel consumption rate (fuel consumption per unit travel distance) may be lowered. A method of making diagnosis only under such a condition that drivability is less likely to deteriorate is also possible. With such a method, however, there will be fewer opportunities for making diagnosis as to an abnormal condition of the WGV.

The present disclosure was made to solve the problem above, and an object thereof is to provide a hybrid vehicle that is capable of diagnosing soundness of control of a waste gate valve while good drivability and fuel consumption rate are maintained during traveling and a method of diagnosing an abnormal condition of a hybrid vehicle.

A hybrid vehicle according to the present disclosure includes a drive wheel, an engine, a first motor generator (which is also referred to as an "MG1" below), a second motor generator (which is also referred to as an "MG2" below), and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a turbocharger, a bypass passage connected to the exhaust passage, a waste gate valve (WGV) provided in the bypass passage, and an actuator that drives the WGV (which is referred to as a "WGV actuator" below). The turbocharger includes a compressor provided in the intake air passage and a turbine provided in the exhaust passage. The compressor and the turbine are rotated together. The bypass passage allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined. The controller makes WGV diagnosis for diagnosing whether or not the WGV is normally controllable by issuing an instruction to the WGV actuator while the controller stops combustion in the engine and controls the MG1 and the MG2 in coordination to perform motoring of the engine by the MG1 and the MG2 during traveling of the hybrid vehicle.

In the hybrid vehicle, diagnosis as to an abnormal condition of the WGV (that is, WGV diagnosis) is made during motoring of the engine where combustion in the engine has been stopped. Therefore, fuel for the engine is not consumed while WGV diagnosis is made. In other words, WGV diagnosis does not deteriorate the fuel consumption rate. The controller controls the MG1 and the MG2 in coordination to perform motoring of the engine. Since the engine, the MG1, the MG2, and the planetary gear are in the relation above in the hybrid vehicle, traveling torque of the hybrid vehicle (that is, torque applied to the drive wheel) can be adjusted by means of the MG2 while a rotation speed of the engine during motoring is adjusted by means of the MG1. For example, when the WGV is opened and the boost pressure is lowered while WGV diagnosis is being made, motive power output from the planetary gear is lowered. In such a case, insufficiency in traveling torque with respect to requested traveling torque can be compensated for by torque of the MG2. Therefore, WGV diagnosis hardly deteriorates drivability. The hybrid vehicle can thus diagnose soundness of control of the waste gate valve while good drivability and fuel consumption rate are maintained during traveling.

While WGV diagnosis is being made, the controller may control the MG2 to generate traveling torque for traveling of the hybrid vehicle and control the MG1 to generate torque for maintaining the rotation speed of the engine constant (which is also referred to as "adjustment torque" below). In WGV diagnosis, the controller may diagnose whether or not the WGV has operated as instructed, based on a behavior of adjustment torque at the time of issuance of the instruction to the WGV actuator.

Engine motoring torque while WGV diagnosis is being made correlates with a boost pressure (and a position of the WGV). When motoring of the engine is performed while forced induction is being performed, compression work increases. Therefore, engine load tends to be higher than when forced induction is not being performed. As opening of the WGV is smaller (that is, the WGV is closer to a fully closed state), engine load increases. Then, adjustment torque (and engine motoring torque) increases with increase in engine load. Therefore, the controller can diagnose whether or not the WGV has operated as instructed, by checking how adjustment torque has varied at the time of issuance of the instruction to the WGV actuator. According to the configuration, a sensor for checking operation of the WGV is not required.

The hybrid vehicle may further include at least one of a boost pressure sensor that detects a boost pressure of the engine and an air flow meter that detects a flow rate of intake air of the engine. In WGV diagnosis, the controller may diagnose whether or not the WGV has operated as instructed, based on a behavior of at least one of the boost pressure and the flow rate of intake air at the time of issuance of the instruction to the WGV actuator.

As opening of the WGV is larger, a flow rate of intake air of the engine decreases and a boost pressure of the engine is lowered. Therefore, the controller can diagnose whether or not the WGV has operated as instructed, by checking how at least one of the boost pressure and the flow rate of intake air has varied at the time of issuance of the instruction to the WGV actuator. According to the configuration, the controller can obtain a result of diagnosis as to an abnormal condition of the WGV based on a detection value from a sensor.

For example, a sensor used in engine control of a vehicle can be employed for each of the boost pressure sensor and the air flow meter. Without being limited as such, a sensor for diagnosis provided at a position where data to be used for diagnosis can be obtained at high sensitivity may be adopted for each of the boost pressure sensor and the air flow meter.

The controller may make a plurality of types of diagnosis of which priority is determined for each type of diagnosis, sequentially from diagnosis higher in priority. The plurality of types of diagnosis may include WGV diagnosis and diagnosis relating to the MG1 and the MG2 (which is also referred to as "MG diagnosis" below). WGV diagnosis may be higher in priority than MG diagnosis. According to such a configuration, WGV diagnosis is higher in priority than MG diagnosis. Therefore, opportunities for WGV diagnosis can readily be increased.

The controller may include an OBD (on board diagnostics) device in conformity with a prescribed OBD standard. WGV diagnosis and MG diagnosis may be included in diagnosis items required by the OBD standard.

Diagnosis data obtained under the OBD standard and accumulated in the OBD device in the hybrid vehicle can be used for inspection, maintenance, and repair of the hybrid vehicle. Based on the diagnosis data, a status of a failure can be known and a location of the failure can be identified. The diagnosis data accumulated in the OBD device can be read, for example, by an external diagnosis device (which is generally also referred to as a "scan tool"). The OBD device may be able to transmit diagnosis data through wireless communication. Examples of the OBD standard include OBDII and OBDIII.

The controller may perform at least one of issuance of a notification that an abnormal condition has occurred and making records that an abnormal condition has occurred when the abnormal condition has been found in WGV diagnosis. The controller may turn on (blink) a malfunction indicator light (MIL) that gives a notification about an abnormal condition of the WGV when the abnormal condition has been found in WGV diagnosis.

The WGV may be a negative pressure driven valve. Since the negative pressure driven WGV tends to be more unstable in operation than an electric WGV, highly frequent diagnosis as to an abnormal condition of the negative pressure driven WGV is required. By highly frequently making diagnosis, a failure can be found in an early stage or accuracy in diagnosis can be enhanced.

The WGV actuator may include a negative pressure pump that generates a negative pressure. The negative pressure pump may be a mechanical pump driven by the engine or an electric pump.

A method of diagnosing an abnormal condition of a hybrid vehicle according to the present disclosure is performed in a hybrid vehicle described below and it includes steps A to C described below.

The hybrid vehicle includes a drive wheel, an engine, a first motor generator (MG1), a second motor generator (MG2), and a controller. Each of the engine, the MG1, and the MG2 is mechanically coupled to the drive wheel. The controller controls the engine, the MG1, and the MG2. The engine includes an engine main body where combustion is performed, an intake air passage and an exhaust passage connected to the engine main body, a turbocharger, a bypass passage connected to the exhaust passage, a waste gate valve (WGV) provided in the bypass passage, and a WGV actuator that drives the WGV. The turbocharger includes a compressor provided in the intake air passage and a turbine provided in the exhaust passage and the compressor and the turbine are rotated together. The bypass passage allows exhaust to flow as bypassing the turbine. Each of the engine and the MG1 is mechanically coupled to the drive wheel with a planetary gear being interposed. The planetary gear and the MG2 are configured such that motive power output from the planetary gear and motive power output from the MG2 are transmitted to the drive wheel as being combined.

In step A, the controller determines whether or not a prescribed execution condition is satisfied during traveling of the hybrid vehicle.

In step B, when the controller determines that the execution condition has been satisfied, the controller makes WGV diagnosis for diagnosing whether or not the WGV is normally controllable by issuing an instruction to the WGV actuator while the controller stops combustion in the engine and controls the MG1 and the MG2 in coordination to perform motoring of the engine.

In step C, when a prescribed quitting condition is satisfied during WGV diagnosis, the controller quits WGV diagnosis.

Since WGV diagnosis described previously is made also with the method, soundness of control of the waste gate valve can be diagnosed while good drivability and fuel consumption rate are maintained during traveling of the hybrid vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a diagram for illustrating an operation by the hybrid vehicle according to the embodiment of the present disclosure.

DESCRIPTION OF THE PREFERRED EMBODIMENTS

Figure 1:
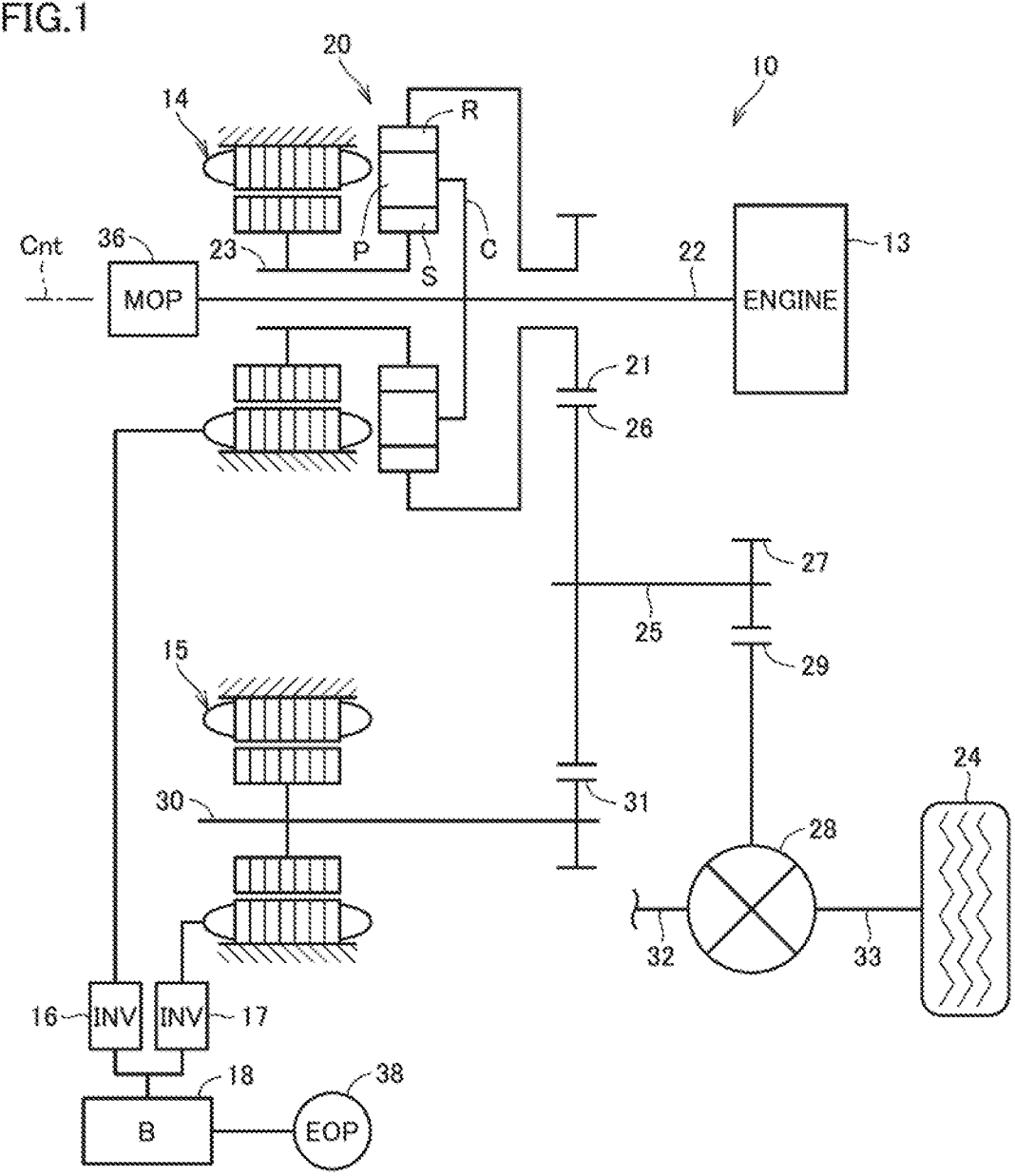
FIG. 1 is a diagram showing a drive device of a hybrid vehicle according to an embodiment of the present disclosure.

An embodiment of the present disclosure will be described in detail below with reference to the drawings. The same or corresponding elements in the drawings have the same reference characters allotted and description thereof will not be repeated. An electronic control unit is also referred to as an "ECU" below. A hybrid vehicle is also referred to as an "HV" and an electric vehicle is also referred to as an "EV".

FIG. 1 is a diagram showing a drive device of a hybrid vehicle according to this embodiment. Referring to FIG. 1, a drive device 10 of the hybrid vehicle (which is also simply referred to as a "vehicle" below) includes an engine 13 and motor generators (MGs) 14 and 15 as sources of motive power for traveling. Each of MGs 14 and 15 is a motor generator that performs both of a function as a motor that outputs torque by being supplied with driving electric power and a function as a generator that generates electric power by being supplied with torque. An alternating current (AC) motor (for example, a permanent magnet synchronous motor or an induction motor) is employed for each of MGs 14 and 15. MG 14 is electrically connected to a battery 18 with a first electric circuit being interposed. The first electric circuit includes a first inverter 16. MG 15 is electrically connected to battery 18 with a second electric circuit being interposed. The second electric circuit includes a second inverter 17. MGs 14 and 15 include rotor shafts 23 and 30, respectively. Rotor shafts 23 and 30 correspond to rotation shafts of MGs 14 and 15, respectively. MG 14 and MG 15 according to the embodiment correspond to an exemplary "first motor generator (MG1)" and an exemplary "second motor generator (MG2)" according to the present disclosure, respectively.

Battery 18 includes, for example, a secondary battery. For example, a lithium ion battery can be adopted as the secondary battery. Battery 18 may include a battery assembly constituted of a plurality of electrically connected secondary batteries (for example, lithium ion batteries). The secondary battery constituting battery 18 is not limited to the lithium ion battery but another secondary battery (for example, a nickel metal hydride battery) may be applicable. A liquid electrolyte secondary battery or an all-solid-state secondary battery may be adopted as battery 18. A large capacity capacitor can also be adopted as battery 18.

Drive device 10 includes a planetary gear mechanism 20. Engine 13 and MG 14 are coupled to planetary gear mechanism 20. Planetary gear mechanism 20 is a single-pinion planetary gear and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Each of engine 13 and MG 14 is mechanically coupled to a drive wheel 24 with planetary gear mechanism 20 being interposed. Engine 13 has output shaft 22 coupled to carrier C. MG 14 has rotor shaft 23 coupled to sun gear S. Ring gear R is coupled to output gear 21.

In planetary gear mechanism 20, carrier C serves as an input element, ring gear R serves as an output element, and sun gear S serves as a reaction force element. Torque output from engine 13 is input to carrier C. Planetary gear mechanism 20 transmits torque output from engine 13 to output shaft 22 by dividing torque into torque to sun gear S (and to MG 14) and torque to ring gear R (and to output gear 21). Ring gear R outputs torque to output gear 21 and reaction force torque is applied to sun gear S by MG 14. Motive power output from planetary gear mechanism 20 (planetary gear) (that is, motive power output to output gear 21) is transmitted to drive wheel 24 through a driven gear 26, a countershaft 25, a drive gear 27, a differential gear 28, and driveshafts 32 and 33 which will be described below.

Drive device 10 further includes countershaft 25, driven gear 26, drive gear 27, differential gear 28, a drive gear 31, and driveshafts 32 and 33. Differential gear 28 corresponds to a final reduction gear and includes a ring gear 29.

Planetary gear mechanism 20 and MG 15 are configured such that motive power output from planetary gear mechanism 20 and motive power output from MG 15 are transmitted to drive wheel 24 as being combined. Specifically, output gear 21 coupled to ring gear R of planetary gear mechanism 20 is meshed with driven gear 26. Drive gear 31 attached to rotor shaft 30 of MG 15 is also meshed with driven gear 26. Countershaft 25 is attached to driven gear 26 and arranged in parallel to axis Cnt. Drive gear 27 is attached to countershaft 25 and meshed with ring gear 29 of differential gear 28. Driven gear 26 functions to combine torque output to rotor shaft 30 by MG 15 and torque output from ring gear R to output gear 21. Drive torque thus combined is transmitted to drive wheel 24 through driveshafts 32 and 33 extending laterally from differential gear 28.

Drive device 10 further includes a mechanical oil pump 36 and an electric oil pump 38. Oil pump 36 is provided coaxially with output shaft 22. Oil pump 36 is driven by engine 13. Oil pump 36 delivers lubricating oil to planetary gear mechanism 20, MG 14, MG 15, and differential gear 28 while engine 13 is on. Electric oil pump 38 is driven by electric power supplied by battery 18 or a not-shown another vehicle-mounted battery (for example, an auxiliary battery) and controlled by an HVECU 62 (see FIG. 3) which will be described later. Electric oil pump 38 delivers lubricating oil to planetary gear mechanism 20, MG 14, MG 15, and differential gear 28 while engine 13 is off. Lubricating oil delivered by each of oil pump 36 and electric oil pump 38 has a cooling function.

Figure 2:
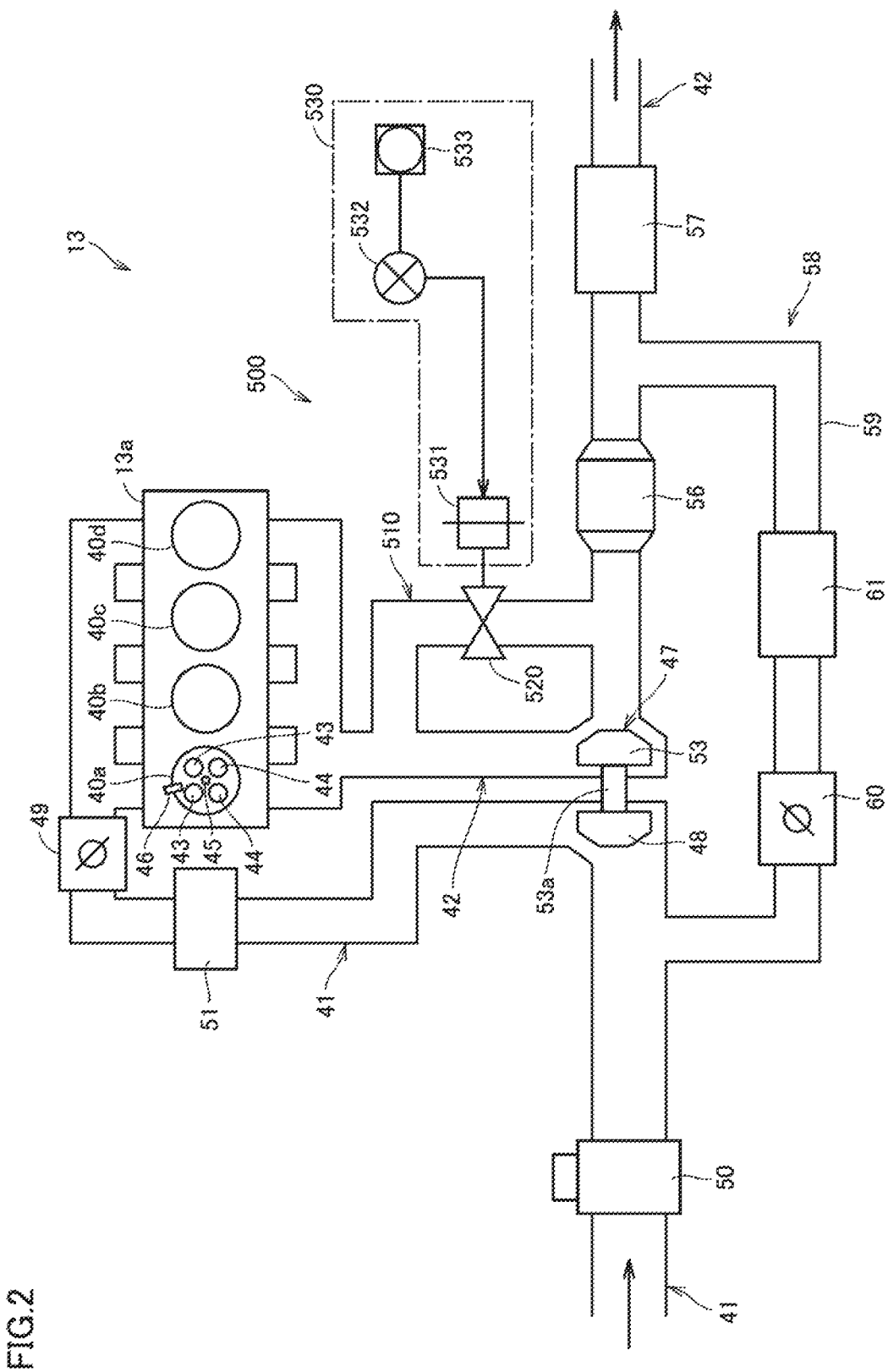
FIG. 2 is a diagram showing an engine of the hybrid vehicle according to the embodiment of the present disclosure.

FIG. 2 is a diagram showing a configuration of engine 13. Referring to FIG. 2, engine 13 is, for example, an in-line four-cylinder spark ignition internal combustion engine. Engine 13 includes an engine main body 13a including four cylinders 40a, 40b, 40c, and 40d. In engine main body 13a, four cylinders 40a, 40b, 40c, and 40d are aligned in one direction. Each of cylinders 40a, 40b, 40c, and 40d will be denoted as a "cylinder 40" below unless they are explained as being distinguished from one another.

An intake air passage 41 and an exhaust passage 42 are connected to each cylinder 40 of engine main body 13a. Intake air passage 41 is opened and closed by two intake valves 43 provided in each cylinder 40, and exhaust passage 42 is opened and closed by two exhaust valves 44 provided in each cylinder 40. An air fuel mixture of air and fuel (for example, gasoline) is generated by adding fuel to air supplied to engine main body 13a through intake air passage 41. Fuel is injected into cylinder 40 by an injector 46 provided, for example, for each cylinder 40 and the air fuel mixture is generated in cylinder 40. An ignition plug 45 provided for each cylinder 40 ignites the air fuel mixture in cylinder 40. Combustion is thus performed in each cylinder 40. Combustion energy generated at the time of combustion of the air fuel mixture in each cylinder 40 is converted to kinetic energy by a piston (not shown) in each cylinder 40 and output to output shaft 22 (FIG. 1). A fuel supply scheme is not limited to direct injection, and may be port injection or both of direct injection and port injection.

Engine 13 includes a turbocharger 47 that uses exhaust energy to boost suctioned air. Turbocharger 47 includes a compressor 48, a turbine 53, and a shaft 53a. Compressor 48 and turbine 53 are coupled to each other with shaft 53a being interposed and rotated together. Rotational force of turbine 53 rotated by receiving a flow of exhaust emitted from engine main body 13a is transmitted to compressor 48 through shaft 53a. As compressor 48 is rotated, intake air toward engine main body 13a is compressed and compressed air is supplied to engine main body 13a. Turbocharger 47 boosts suctioned air (that is, increases a density of air suctioned into engine main body 13a) by rotating turbine 53 and compressor 48 by using exhaust energy.

Compressor 48 is arranged in intake air passage 41. An air flow meter 50 is provided at a position upstream from compressor 48 in intake air passage 41. Air flow meter 50 outputs a signal in accordance with a flow rate of air that flows through intake air passage 41. An intercooler 51 is provided at a position downstream from compressor 48 in intake air passage 41. Intercooler 51 cools intake air compressed by compressor 48. A throttle valve (intake throttle valve) 49 is provided at a position downstream from intercooler 51 in intake air passage 41. Throttle valve 49 can regulate a flow rate of intake air that flows through intake air passage 41. Air that flows into intake air passage 41 is supplied to each cylinder 40 of engine main body 13a sequentially through air flow meter 50, compressor 48, intercooler 51, and throttle valve 49 in this order.

Turbine 53 is arranged in exhaust passage 42. A start catalyst converter 56 and an aftertreatment apparatus 57 are provided downstream from turbine 53 in exhaust passage 42. In exhaust passage 42, a WGV apparatus 500 described below is further provided.

WGV apparatus 500 allows exhaust emitted from engine main body 13a to flow as bypassing turbine 53, and can adjust an amount of bypassed exhaust. WGV apparatus 500 includes a bypass passage 510, a waste gate valve (WGV) 520, and a WGV actuator 530.

Bypass passage 510 is connected to exhaust passage 42 and allows exhaust to flow therethrough as bypassing turbine 53. Bypass passage 510 is branched from a portion of exhaust passage 42 upstream from turbine 53 (for example, between engine main body 13a and turbine 53) and is merged with a portion of exhaust passage 42 downstream from turbine 53 (for example, between turbine 53 and start catalyst converter 56).

WGV 520 is arranged in bypass passage 510 and can regulate a flow rate of exhaust guided from engine main body 13a to bypass passage 510. As a flow rate of exhaust guided from engine main body 13a to bypass passage 510 increases, a flow rate of exhaust guided from engine main body 13a to turbine 53 decreases. Depending on a position of WGV 520, a flow rate of exhaust that flows into turbine 53 (and a boost pressure) is varied. As WGV 520 is closed (that is, closer to a fully closed state), a flow rate of exhaust that flows into turbine 53 increases and a pressure of suctioned air (that is, a boost pressure) is higher.

WGV 520 is a negative pressure driven valve driven by WGV actuator 530. WGV actuator 530 includes a negative pressure driven diaphragm 531, a negative pressure regulation valve 532, and a negative pressure pump 533. Diaphragm 531 is coupled to WGV 520 and WGV 520 is driven by a negative pressure introduced into diaphragm 531. In the embodiment, WGV 520 is a normally closed valve and opening of WGV 520 is larger as the negative pressure applied to diaphragm 531 is larger in magnitude. Negative pressure pump 533 is connected to diaphragm 531 with negative pressure regulation valve 532 being interposed.

Negative pressure pump 533 is a mechanical pump (for example, a vane type mechanical pump) driven by engine 13. Negative pressure pump 533 generates a negative pressure with motive power output to output shaft 22 (FIG. 1) of engine 13. While engine 13 is on, negative pressure pump 533 is also on, and when engine 13 is stopped, negative pressure pump 533 is also stopped. Negative pressure regulation valve 532 can regulate magnitude of a negative pressure applied to diaphragm 531. As opening of negative pressure regulation valve 532 is larger, a negative pressure applied to diaphragm 531 is larger in magnitude. Negative pressure regulation valve 532 is controlled by HVECU 62 (see FIG. 3) which will be described later. For example, a two-position electromagnetic valve that can alternatively select any one of a fully open (communicating) state and a fully closed (cut-off) state can be adopted for negative pressure regulation valve 532. When a negative pressure generated by negative pressure pump 533 is no longer applied to diaphragm 531, a pressure applied to diaphragm 531 returns to the atmospheric pressure. WGV actuator 530 may include a relief valve (not shown) that opens a negative pressure pipe connected to diaphragm 531 to the atmosphere. The relief valve may be opened and closed in accordance with a pressure in the negative pressure pipe and may be in coordination with negative pressure regulation valve 532. The relief valve may be controlled by HVECU 62 (FIG. 3) which will be described later. As the relief valve is opened when negative pressure regulation valve 532 is closed, a rate of weakening (becoming closer to the atmospheric pressure) of the negative pressure applied to diaphragm 531 can be increased.

Exhaust emitted from engine main body 13a passes through any of turbine 53 and WGV 520 and emitted into the atmosphere after a harmful substance is removed therefrom by start catalyst converter 56 and aftertreatment apparatus 57. Aftertreatment apparatus 57 contains, for example, a three-way catalyst.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41 by connecting a portion of exhaust passage 42 between start catalyst converter 56 and aftertreatment apparatus 57 and a portion of intake air passage 41 between compressor 48 and air flow meter 50 to each other. EGR valve 60 and EGR cooler 61 are provided in EGR passage 59. EGR valve 60 can regulate a flow rate of EGR gas that flows through EGR passage 59. EGR cooler 61 cools EGR gas that flows through EGR passage 59.

Figure 3:
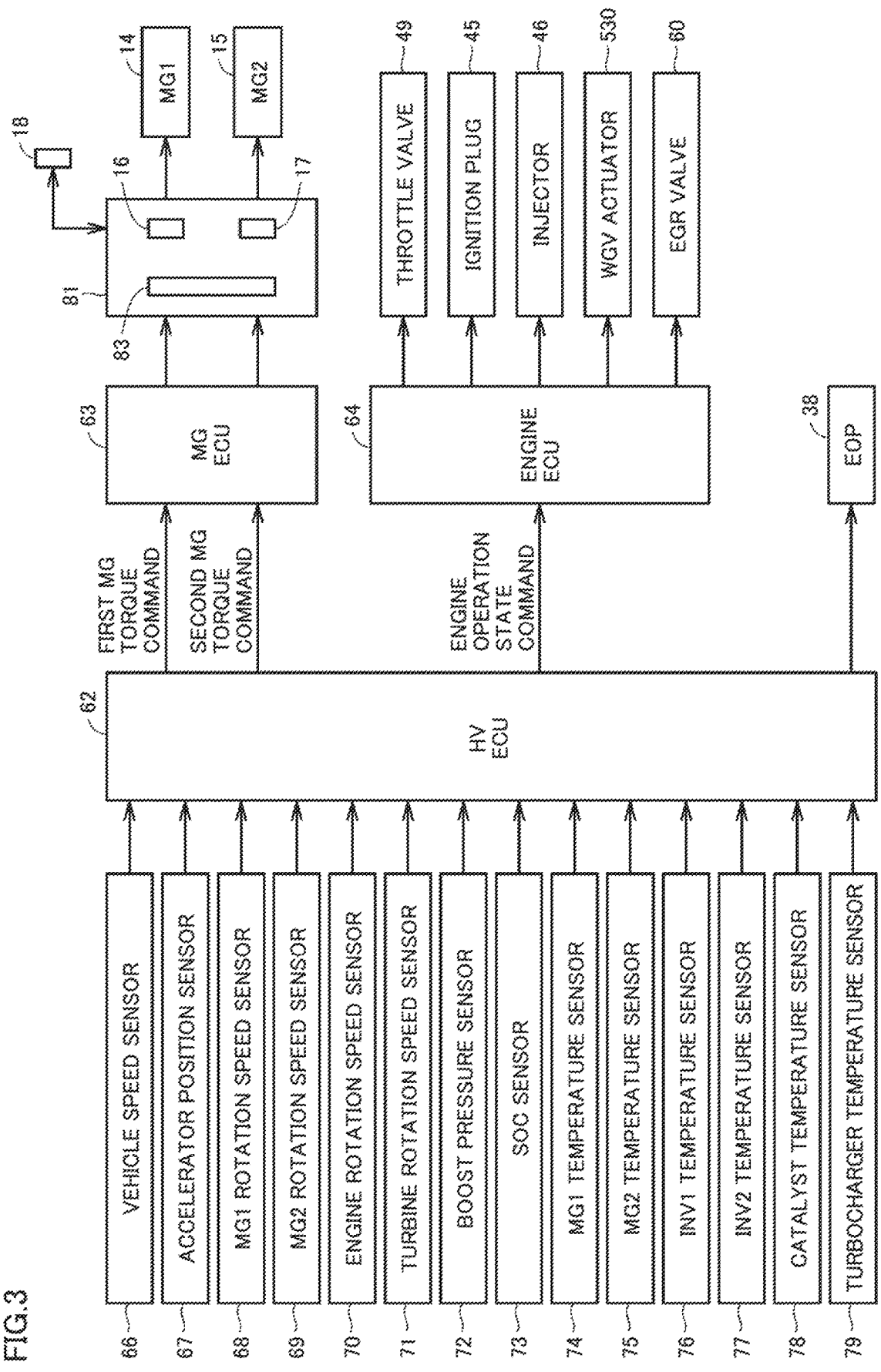
FIG. 3 is a diagram showing a control system of the hybrid vehicle according to the embodiment of the present disclosure.

FIG. 3 is a diagram showing a control system of the hybrid vehicle according to the embodiment. Referring to FIG. 3 together with FIGS. 1 and 2, the control system of the vehicle includes HVECU 62, an MGECU 63, and an engine ECU 64. A vehicle speed sensor 66, an accelerator position sensor 67, an MG1 rotation speed sensor 68, an MG2 rotation speed sensor 69, an engine rotation speed sensor 70, a turbine rotation speed sensor 71, a boost pressure sensor 72, an SOC sensor 73, an MG1 temperature sensor 74, an MG2 temperature sensor 75, an INV1 temperature sensor 76, an INV2 temperature sensor 77, a catalyst temperature sensor 78, and a turbocharger temperature sensor 79 are connected to HVECU 62.

Vehicle speed sensor 66 outputs a signal in accordance with a speed of the vehicle (that is, a traveling speed of the vehicle) to HVECU 62. Accelerator position sensor 67 outputs a signal in accordance with an accelerator position (for example, an amount of pressing of an accelerator pedal) to HVECU 62. The accelerator position is a parameter that represents an amount of acceleration requested of the vehicle by a driver (which is also referred to as a "requested acceleration amount" below). As a degree of pressing of the accelerator is higher, the requested acceleration amount is larger.

MG1 rotation speed sensor 68 outputs a signal in accordance with a rotation speed of MG 14 to HVECU 62. MG2 rotation speed sensor 69 outputs a signal in accordance with a rotation speed of MG 15 to HVECU 62. Engine rotation speed sensor 70 outputs a signal in accordance with a rotation speed of output shaft 22 of engine 13 to HVECU 62. Turbine rotation speed sensor 71 outputs a signal in accordance with a rotation speed of turbine 53 of turbocharger 47 to HVECU 62. Boost pressure sensor 72 outputs a signal in accordance with a boost pressure of engine 13 to HVECU 62.

SOC sensor 73 outputs a signal in accordance with a state of charge (SOC) representing a ratio of a remaining charge amount to a full charge amount (that is, a power storage capacity) of battery 18 to HVECU 62. MG1 temperature sensor 74 outputs a signal in accordance with a temperature of MG 14 to HVECU 62. MG2 temperature sensor 75 outputs a signal in accordance with a temperature of MG 15 to HVECU 62. INV1 temperature sensor 76 outputs a signal in accordance with a temperature of first inverter 16 to HVECU 62. INV2 temperature sensor 77 outputs a signal in accordance with a temperature of second inverter 17 to HVECU 62. Catalyst temperature sensor 78 outputs a signal in accordance with a temperature of aftertreatment apparatus 57 to HVECU 62. Turbocharger temperature sensor 79 outputs a signal in accordance with a temperature at a prescribed portion in turbocharger 47 (for example, a temperature of turbine 53) to HVECU 62.

The vehicle can travel in an HV traveling mode and an EV traveling mode. Traveling in the HV traveling mode is referred to as "HV traveling" below and traveling in the EV traveling mode is referred to as "EV traveling" below. HV traveling is performed by engine 13 and MG 15 with generation of traveling driving force by engine 13. EV traveling is performed by MG 15 without generation of traveling driving force by engine 13. HVECU 62 selects a suitable traveling mode depending on a situation and the vehicle travels in the selected traveling mode. HVECU 62 calculates requested driving force, for example, based on an accelerator position and a vehicle speed, and controls engine 13, MG 14, and MG 15 in coordination such that requested driving force is output to drive wheel 24. In HV traveling, torque obtained by combining torque output by engine 13 and torque output by MG 15 serves as traveling driving force. In EV traveling, torque output by MG 15 serves as traveling driving force. Torque to be generated by MG 15 is calculated such that requested driving force is output to drive wheel 24.

HVECU 62 controls an operating point of engine 13 to a target operating point. The operating point of engine 13 refers to a state of operation of engine 13 defined by engine torque and an engine rotation speed. HVECU 62 calculates requested engine power based on the traveling mode and requested driving force and determines a target operating point based on requested engine power. HVECU 62 sets as the target operating point, for example, an intersection between a line (an equal power line) at which engine power is equal to requested engine power and an optimal fuel efficiency line on a coordinate plane of the engine rotation speed and engine torque. A line that connects operating points of the engine at which fuel efficiency is highest on the coordinate plane of the engine rotation speed and engine torque to one another is defined as the optimal fuel efficiency line.

HVECU 62 can adjust a rotation speed of engine 13 by controlling a rotation speed of MG 14. HVECU 62 can arbitrarily control a rotation speed of MG 14 in accordance with magnitude of a current fed to MG 14 and a frequency thereof. Torque to be generated by MG 14 is calculated such that the operating point of engine 13 is set to the target operating point.

HVECU 62 outputs to engine ECU 64, a command for controlling engine 13. Engine ECU 64 controls throttle valve 49, ignition plug 45, injector 46, WGV actuator 530, and EGR valve 60 in accordance with a command from HVECU 62. HVECU 62 can control the engine by means of engine ECU 64. For example, when engine torque exceeds a threshold value, HVECU 62 makes a request to engine ECU 64 for forced induction, and when engine torque is equal to or smaller than the threshold value, it makes a request to engine ECU 64 for stop of forced induction. Engine ECU 64 controls WGV 520 to open and close in response to a request from HVECU 62. In order to suppress frequent opening and closing of WGV 520 (and on and off of forced induction), hysteresis may be set for the threshold value of engine torque (that is, a threshold value for on of forced induction being different from a threshold value for off of forced induction).

In the embodiment, HVECU 62 controls WGV 520 to fully be closed when forced induction is to be performed, and controls WGV 520 to fully be opened when forced induction is not to be performed. For example, when engine torque exceeds the threshold value while forced induction is off, HVECU 62 makes a request to engine ECU 64 for forced induction (that is, closing of WGV 520). When engine ECU 64 issues an instruction to close to negative pressure regulation valve 532 in WGV actuator 530 in response to the request, negative pressure regulation valve 532 is fully closed and a negative pressure generated by negative pressure pump 533 is no longer applied to diaphragm 531. WGV 520 is thus fully closed and forced induction is performed. When engine torque is equal to or smaller than the threshold value while forced induction is being performed, HVECU 62 makes a request to engine ECU 64 for stop of forced induction (that is, opening of WGV 520). When engine ECU 64 issues an instruction to open to negative pressure regulation valve 532 in WGV actuator 530 in response to the request, negative pressure regulation valve 532 is fully opened and a negative pressure generated by negative pressure pump 533 is applied to diaphragm 531. WGV 520 is thus fully opened and forced induction is stopped.

HVECU 62 outputs a command for controlling each of MG 14 and MG 15 to MGECU 63. MGECU 63 controls MG 14 and MG 15 by means of a PCU 81. MGECU 63 generates a current signal (for example, a signal representing magnitude and a frequency of a current) corresponding to target torque of each of MG 14 and MG 15 in accordance with a command from HVECU 62 and outputs a generated current signal to PCU 81. HVECU 62 can control the motor by means of MGECU 63.

PCU 81 includes first inverter 16, second inverter 17, and a converter 83. First inverter 16 and converter 83 convert electric power between battery 18 and MG 14. Second inverter 17 and converter 83 convert electric power between battery 18 and MG 15. PCU 81 has electric power stored in battery 18 supplied to each of MG 14 and MG 15, and has electric power generated by each of MG 14 and MG 15 supplied to battery 18. PCU 81 can control states of MGs 14 and 15 separately, and, for example, it can set MG 14 to a regeneration state (that is, a power generation state) while it can set MG 15 to a power running state.

Figure 4:
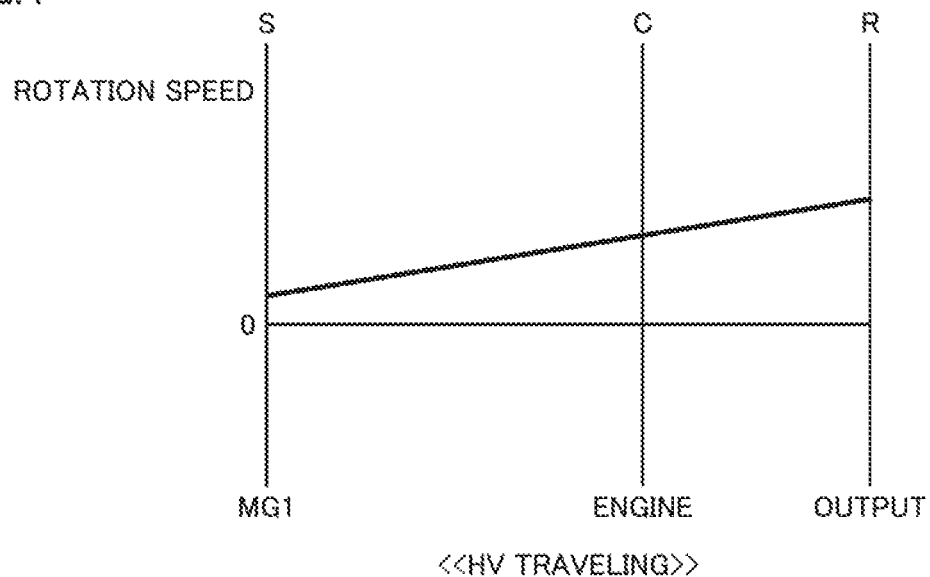
FIG. 4 is a nomographic chart showing exemplary relation among rotation speeds of rotary elements (a sun gear, a carrier, and a ring gear) of a planetary gear during HV traveling, in the hybrid vehicle according to the embodiment of the present disclosure.

FIG. 4 is a nomographic chart showing exemplary relation among rotation speeds of sun gear S, carrier C, and ring gear R of planetary gear mechanism 20 during HV traveling. Referring to FIG. 4, in exemplary HV traveling, in transmission of torque output from engine 13 (that is, torque input to carrier C) to drive wheel 24, MG 14 applies reaction force to sun gear S of planetary gear mechanism 20. Therefore, sun gear S functions as a reaction force element. In HV traveling, in order to apply torque in accordance with target engine torque based on an acceleration request to drive wheel 24, MG 14 is caused to output reaction force torque against target engine torque. MG 14 can perform regenerative electricity generation by using this reaction force torque.

Figure 5:
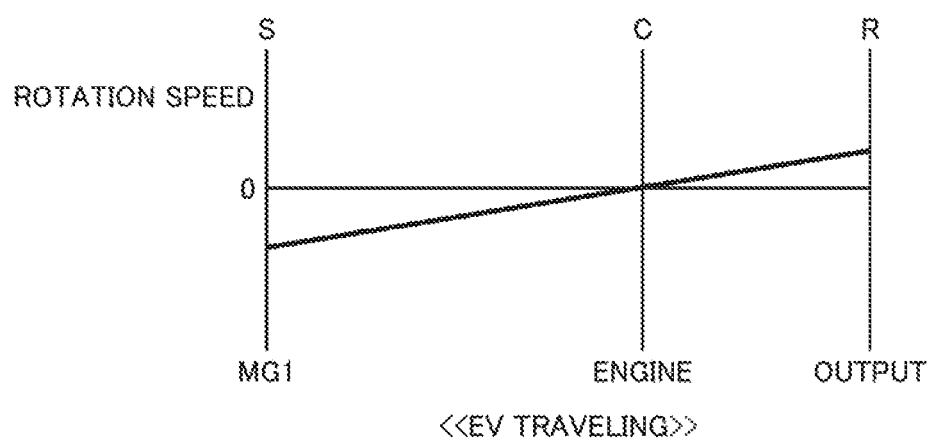
FIG. 5 is a nomographic chart showing exemplary relation among rotation speeds of the rotary elements (the sun gear, the carrier, and the ring gear) of the planetary gear during EV traveling, in the hybrid vehicle according to the embodiment of the present disclosure.

FIG. 5 is a nomographic chart showing exemplary relation among rotation speeds of sun gear S, carrier C, and ring gear R of planetary gear mechanism 20 during EV traveling. Referring to FIG. 5, in EV traveling, MG 15 generates traveling driving force without generation of traveling driving force by engine 13. In EV traveling, HVECU 62 controls ignition plug 45 and injector 46 so as not to allow combustion in engine 13. Since normal EV traveling is carried out without rotation of engine 13, the rotation speed of carrier C is 0 as shown in FIG. 5. In the embodiment, however, motoring of engine 13 is performed while WGV diagnosis which will be described later is being made and hence EV traveling may be performed with engine 13 being rotated (see FIG. 9).

Figure 6:
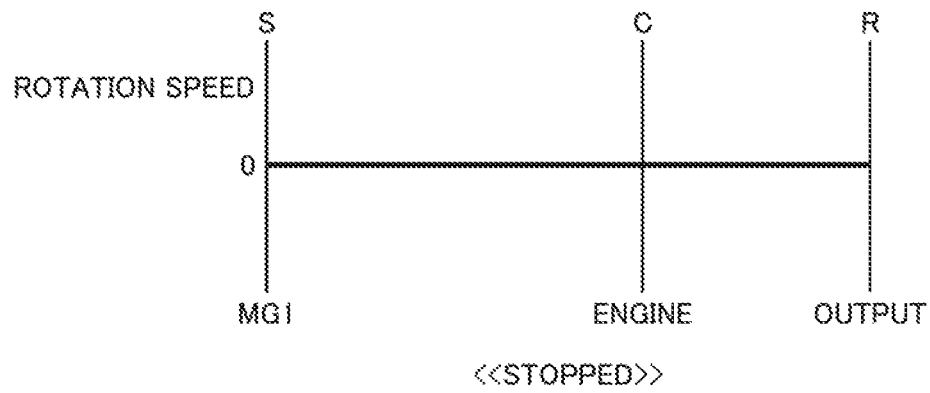
FIG. 6 is a nomographic chart showing exemplary relation among rotation speeds of the rotary elements (the sun gear, the carrier, and the ring gear) of the planetary gear while the vehicle is parked, in the hybrid vehicle according to the embodiment of the present disclosure.

FIG. 6 is a nomographic chart showing exemplary relation among rotation speeds of sun gear S, carrier C, and ring gear R of planetary gear mechanism 20 while the vehicle is parked. Referring to FIG. 6, HVECU 62 controls engine 13 and MGs 14 and 15 to set the rotation speed of each of sun gear S, carrier C, and ring gear R to 0, so that traveling of the vehicle is stopped and the vehicle is in a stopped state.

Figure 7:
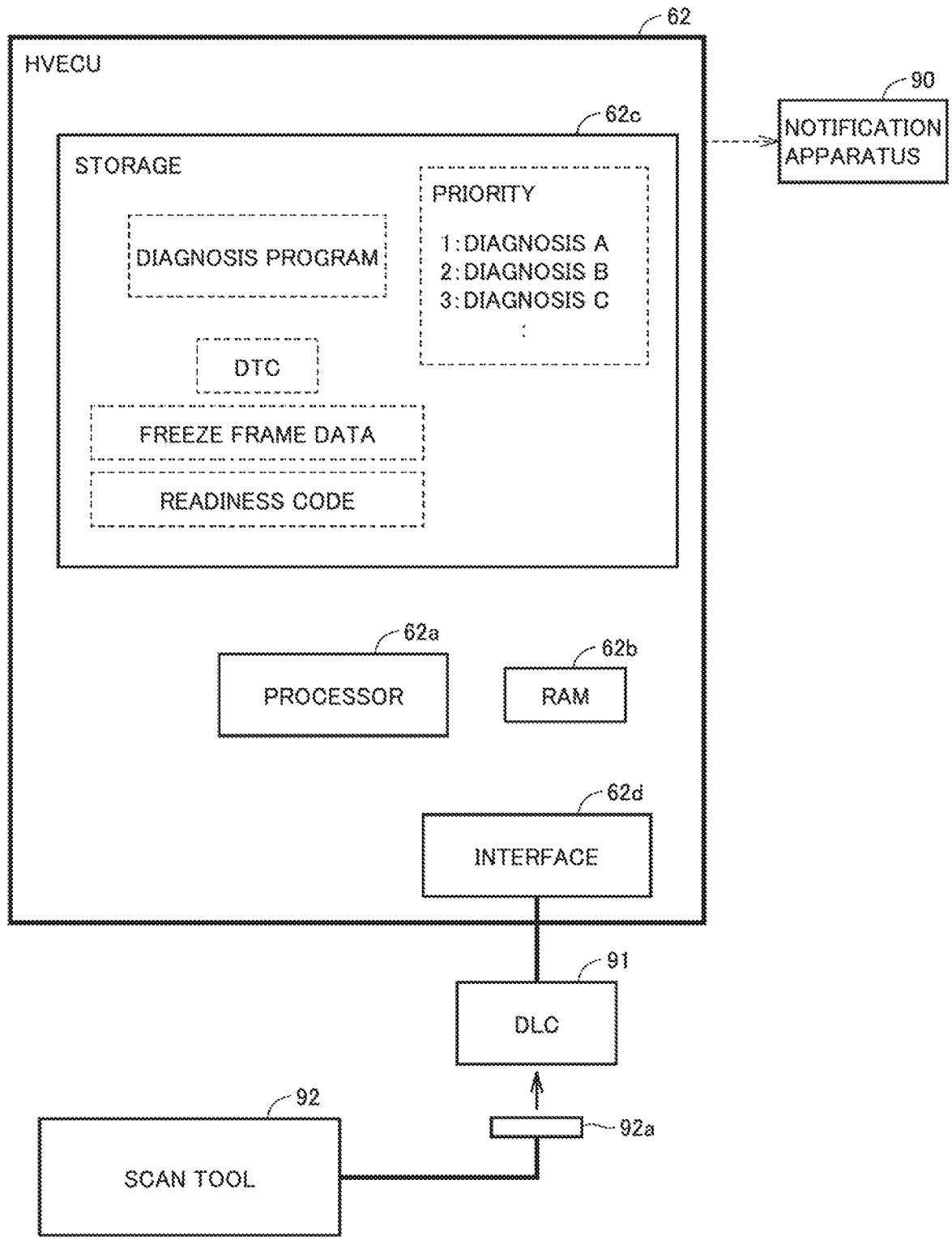
FIG. 7 is a diagram showing a configuration involved with OBD, of the hybrid vehicle according to the embodiment of the present disclosure.

FIG. 7 is a diagram showing a configuration involved with OBD, of the hybrid vehicle according to the embodiment. Referring to FIG. 7, HVECU 62 includes a processor 62a, a random access memory (RAM) 62b, and a storage 62c as well as input and output ports and a timer that are not shown. For example, a central processing unit (CPU) can be adopted as processor 62a. RAM 62b functions as a work memory that temporarily stores data to be processed by processor 62a. Storage 62c is capable of saving information that has been put therein. Storage 62c includes, for example, a read only memory (ROM) and a rewritable non-volatile memory. Storage 62c has various programs stored thereon. As processor 62a executes a program stored in storage 62c, various types of control of the vehicle are carried out. Other ECUs (for example, MGECU 63 and engine ECU 64) are also the same in above-described hardware configuration as HVECU 62. Though HVECU 62, MGECU 63, and engine ECU 64 are separately provided in the embodiment, a single ECU may perform functions thereof.

HVECU 62 further includes an interface 62d with a data link connector (DLC) 91. DLC 91 is a connector that can be connected to a connector 92a of a scan tool 92, and arranged, for example, around a driver's seat of the vehicle. Scan tool 92 is an external diagnosis device, for example, for a user (for example, a mechanic) to know a state of the vehicle in a garage. Examples of scan tool 92 include a general scan tool (GST). By connecting connector 92a of scan tool 92 to DLC 91, diagnosis data accumulated in storage 62c can be read. Diagnosis data recorded in storage 62c includes, for example, a diagnostic trouble code (DTC), freeze frame data, and a readiness code.

The DTC is information representing a location of a failure and details of the failure. When HVECU 62 makes diagnosis and diagnoses the vehicle as being in an abnormal condition, it has storage 72c record (set) the DTC. A user can know what kind of failure has occurred in which part of the vehicle by checking the DTC. The freeze frame data is information representing a condition of the vehicle at the time of detection of a failure (for example, detection values from various sensors mounted on the vehicle). The user can estimate a condition of the vehicle at the time of occurrence of a failure (during traveling at a high speed or cold drive) by checking the freeze frame data. The readiness code is information representing whether or not a function to diagnose each diagnosis item is appropriately performed, and it is recorded for each diagnosis item. When the function to diagnose a certain diagnosis item is normally performed, the readiness code corresponding to the diagnosis item is recorded (set) in storage 62c. A situation that the readiness code has been set but no DTC has been set for a certain diagnosis item means that the diagnosis item is normal.

In storage 62c, a diagnosis program relating to a plurality of types of diagnosis items is stored, and as processor 62a executes the diagnosis program, a plurality of types of diagnosis are made. In storage 62c, priority for each type of diagnosis is stored, and processor 62a makes diagnosis in accordance with the priority. For example, when the priority is set for three types of diagnoses A to C such as "1" for diagnosis A, "2" for diagnosis B, and "3" for diagnosis C, diagnosis is made sequentially from diagnosis higher in priority (that is, in the order of diagnosis A, diagnosis B, and diagnosis C). In the embodiment, the plurality of types of diagnosis items are those required by a prescribed OBD standard (for example, OBDII). HVECU 62 according to the embodiment includes an OBD device in conformity with the prescribed OBD standard (for example, OBDII). The OBD device is implemented by processor 62a and a diagnosis program executed by processor 62a. Without being limited as such, the OBD device may be implemented by dedicated hardware (electronic circuits). The plurality of types of diagnosis made by HVECU 62 are also referred to as "OBD diagnosis" below.

In the embodiment, OBD diagnosis includes diagnosis relating to WGV 520 (WGV diagnosis) and diagnosis relating to MGs 14 and 15 (MG diagnosis). WGV diagnosis refers to diagnosis as to whether or not HVECU 62 can normally control WGV 520. MG diagnosis refers to diagnosis as to whether or not HVECU 62 can normally control MG 14 and MG 15. OBD diagnosis may further include another diagnosis in addition to WGV diagnosis and MG diagnosis. For example, OBD diagnosis may further include diagnosis relating to at least one of combustion in the engine, purification of exhaust (for example, deterioration of the catalyst), and EGR apparatus 58.

The plurality of types of diagnosis are made in accordance with the priority, for example, for each trip of the vehicle. Even though diagnosis low in priority was not made in a previous trip, diagnosis is made in the present trip sequentially from diagnosis highest in priority. In the embodiment, WGV diagnosis is higher in priority than MG diagnosis. HVECU 62 makes WGV diagnosis prior to MG diagnosis in the same trip. One trip refers to a period from turn-on of a start switch (not shown) of the vehicle by a user (for example, a driver) until turn-off of the start switch. The start switch refers to a switch for starting a vehicle system and it is generally referred to as a "power switch" or an "ignition switch."

The vehicle further includes a notification apparatus 90. Notification apparatus 90 performs prescribed processing for giving a notification to a user (for example, a driver) when requested by HVECU 62. Examples of notification apparatus 90 include a display (for example, a meter panel or a head-up display), a speaker, and an indicator (for example, an MIL). A portable device (for example, a smartphone) may be applicable as notification apparatus 90.

Such a method of issuing an instruction to drive WGV 520 to open from HVECU 62 to WGV actuator 530 while the vehicle is performing HV traveling with forced induction of engine 13 being performed (that is, WGV 520 being closed) and determining whether or not WGV 520 has opened as instructed and whether or not a boost pressure has been varied based on output from boost pressure sensor 72 is available as a method of diagnosing an abnormal condition of WGV 520. With the method, however, a position of WGV 520 is varied and engine torque is varied during diagnosis. Therefore, traveling torque applied to drive wheel 24 of the vehicle may be varied and drivability of the vehicle may become poor during diagnosis. When an operation condition of engine 13 is determined only in consideration of drivability during diagnosis, a fuel consumption rate may be lowered. A method of making diagnosis only under such a condition that drivability is less likely to deteriorate is also possible. With such a method, however, there will be fewer opportunities for making diagnosis as to an abnormal condition of WGV 520.

In the hybrid vehicle according to the embodiment, HVECU 62 makes WGV diagnosis described previously (that is, diagnosis as to whether or not WGV 520 can normally be controlled) by issuing an instruction to WGV actuator 530 (more specifically, negative pressure regulation valve 532) while it stops combustion in engine 13 and controls MG 14 and MG 15 in coordination to perform motoring of engine 13 during traveling of the hybrid vehicle. HVECU 62 performs, for example, processing shown in FIG. 8. HVECU 62 according to the embodiment corresponds to an exemplary "controller" according to the present disclosure.

Figure 8:
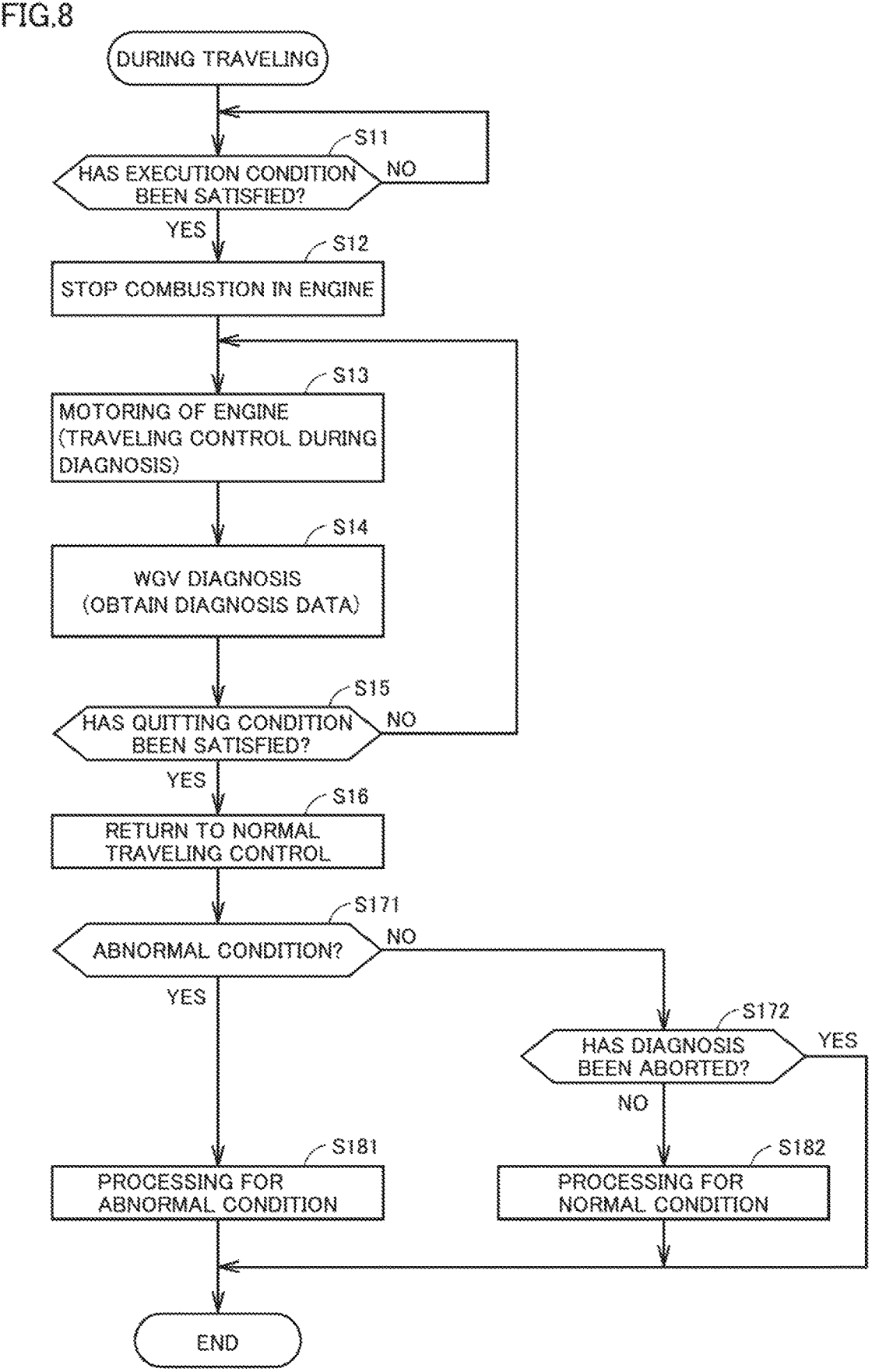
FIG. 8 is a flowchart showing a procedure in processing for WGV diagnosis performed by a controller shown in FIG. 7.

FIG. 8 is a flowchart showing a procedure in processing for WGV diagnosis performed by HVECU 62. Processing shown in the flowchart is performed during traveling of the vehicle. Though not shown, traveling control without WGV diagnosis (that is, processing in S12 and later) is carried out in parallel to the process in FIG. 8. Hereinafter, traveling control without WGV diagnosis is also referred to as "normal traveling control." Under normal traveling control, engine 13 is stopped during EV traveling and the engine is controlled during HV traveling in accordance with an optimal fuel efficiency line described previously.

Referring to FIG. 8 together with FIG. 3, in a step (which is also simply denoted as "S" below) 11, HVECU 62 determines whether or not an execution condition for WGV diagnosis is satisfied. In the embodiment, the execution condition is satisfied when all requirements necessary for satisfying the condition (which are also referred to as "execution necessary requirements" below) are satisfied. Though the execution necessary requirements can arbitrarily be set, (A-1) to (A-3) shown below are defined as the execution necessary requirements in the embodiment.

(A-1) A state of traveling of the vehicle is stable (for example, variation in accelerator position per unit time is not more than a prescribed value).

(A-2) Diagnoses higher in priority than WGV diagnosis have all been completed by the time of the present trip.

(A-3) Forced induction in engine 13 is being performed (that is, WGV actuator 530 drives WGV 520 to fully be closed).

When at least one of (A-1) to (A-3) is not satisfied (NO in S11), the process does not proceed to S12 or later, and S11 is repeatedly performed. When all of (A-1) to (A-3) are satisfied (YES in S11), the process proceeds to S12.

In S12, HVECU 62 controls ignition plug 45 and injector 46 to cut off fuel and stop ignition so as not to allow combustion in engine 13. In succession, in S13, HVECU 62 controls MG 14 and MG 15 in coordination to perform motoring of engine 13.

Figure 9:
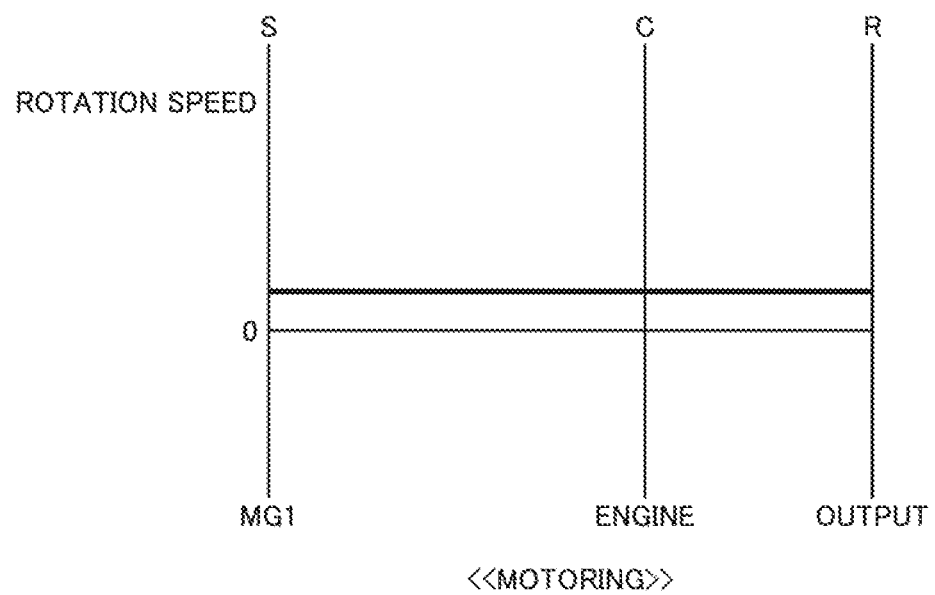
FIG. 9 is a nomographic chart showing exemplary relation among rotation speeds of the rotary elements (the sun gear, the carrier, and the ring gear) of the planetary gear during motoring, in the hybrid vehicle according to the embodiment of the present disclosure.

FIG. 9 is a nomographic chart showing exemplary relation among rotation speeds of sun gear S, carrier C, and ring gear R of planetary gear mechanism 20 during motoring in S13. Referring to FIG. 9, during motoring in S13, engine 13 is in a combustion off state, and traveling driving force is not generated in engine 13. HVECU 62 controls MGs 14 and 15 in coordination to perform motoring of engine 13 in the combustion off state. During motoring in S13, HVECU 62 maintains a position of throttle valve 49 constant (for example, at a fully open position), controls MG 15 to generate traveling torque for traveling the vehicle, and controls MG 14 to generate adjustment torque for maintaining the rotation speed of engine 13 constant. HVECU 62 carries out feedback control of MG 14 so as to bring the rotation speed of engine 13 closer to a prescribed target speed (for example, 3000 rpm) while it controls engine rotation speed sensor 70 to detect the rotation speed of engine 13. Engine motoring torque is uniquely determined by a planetary gear ratio ρ and torque of MG 14. As MG 15 generates traveling torque during motoring, the vehicle can continue EV traveling. While WGV diagnosis is being made, traveling control as above (which is also referred to as "traveling control during diagnosis" below) is carried out. Though the rotation speed of MG 14 (and the rotation speed of sun gear S) is substantially equal to the rotation speed of ring gear R in the example shown in FIG. 9, the rotation speed of MG 14 during motoring in S13 may be higher or lower than the rotation speed of ring gear R.

Referring again to FIG. 8, in S14, HVECU 62 makes WGV diagnosis by giving an instruction to negative pressure regulation valve 532 in WGV actuator 530 during motoring of engine 13 in the combustion off state in accordance with the processing in S13. In the embodiment, HVECU 62 issues an instruction to open to negative pressure regulation valve 532 by means of engine ECU 64 while it calculates adjustment torque to be generated by MG 14 (for example, average torque of MG 14 required for maintaining the rotation speed of engine 13 at 3000 rpm). HVECU 62 continues calculation of adjustment torque also after issuance of the instruction to negative pressure regulation valve 532 and has storage 62c (FIG. 7) record calculated adjustment torque.

After the processing in S14, HVECU 62 determines in S15 whether or not a condition for quitting WGV diagnosis is satisfied. During a period until the quitting condition described below is satisfied (that is, a period for which determination as NO is made in S15), S13 to S15 are repeatedly performed so that WGV diagnosis is made.

In the embodiment, the quitting condition (S15) is satisfied in both of a case where all requirements necessary for satisfying the condition (which are also referred to as "quitting necessary requirements" below) are satisfied and a case where only one of requirements sufficient for satisfying the condition (which is also referred to as a "quitting sufficient requirement" below) is satisfied. Though each of the quitting necessary requirement and the quitting sufficient requirement can arbitrarily be set, (B) shown below is defined as the quitting necessary requirement and (C-1) and (C-2) shown below are defined as the quitting sufficient requirements in the embodiment.

(B) HVECU 62 has obtained all pieces of data to be used for diagnosis.

(C-1) A driver has turned off the accelerator (for example, the driver has moved his/her foot away from the accelerator pedal).

(C-2) Traveling torque requested by the driver has greatly been varied (for example, variation in accelerator position per unit time has exceeded a prescribed value).

When (B) is satisfied, HVECU 62 determines that the condition for quitting WGV diagnosis is satisfied (YES in S15). For example, in both of a case where WGV 520 being fully open is indicated by adjustment torque of MG 14 and a case where a prescribed time period has elapsed since issuance of the instruction from HVECU 62 to WGV actuator 530, HVECU 62 determines that (B) is satisfied. In the former case, WGV 520 is fully open as instructed, which hence means that no abnormal condition has been found in WGV diagnosis, that is, HVECU 62 could normally control WGV 520. In the latter case, WGV 520 has not operated as instructed within a prescribed time period, which hence means that an abnormal condition has been found in WGV diagnosis, that is, HVECU 62 could not normally control WGV 520.

While WGV diagnosis is being made (that is, during a period for which determination as NO is made in S15), HVECU 62 carries out traveling control during diagnosis (S13) described previously. Specifically, MG 15 generates traveling torque while MG 14 generates adjustment torque to maintain the rotation speed of engine 13 constant, so that the vehicle continues EV traveling. HVECU 62 can diagnose whether or not WGV 520 has operated as instructed, based on a behavior of adjustment torque at the time of issuance of the instruction to WGV actuator 530 in S14 and S15. As opening of WGV 520 is larger (that is, WGV 520 is closer to the fully opened state), engine load tends to be lower and adjustment torque (and engine motoring torque) tends to be lower with lowering in engine load. Therefore, HVECU 62 can diagnose whether or not WGV 520 has operated as instructed, by checking how adjustment torque has been varied when it issued the instruction to WGV actuator 530. HVECU 62 can check whether WGV 520 is fully open or fully closed based on magnitude of adjustment torque at the time of issuance of the instruction to drive WGV 520 to fully open or fully close to WGV actuator 530. Examples where WGV 520 does not operate as instructed (that is, an exemplary abnormal condition) include a state that WGV 520 is not fully opened in spite of issuance of an instruction to drive WGV 520 to fully open from HVECU 62 to WGV actuator 530, a state that WGV 520 is not fully closed in spite of issuance of an instruction to drive WGV 520 to fully close from HVECU 62 to WGV actuator 530, a state that WGV 520 does not react to a drive instruction, and a state that a response speed of WGV 520 is excessively low.

In the embodiment, it is determined that the condition for quitting WGV diagnosis is satisfied (YES in S15) also when at least one of (C-1) and (C-2) is satisfied while WGV diagnosis is being made. When at least one of (C-1) and (C-2) is satisfied, it is highly likely that an accurate diagnosis result is not obtained. Therefore, HVECU 62 aborts WGV diagnosis.

HVECU 62 determines that the condition for quitting WGV diagnosis is not satisfied (NO in S15) when none of (B), (C-1), and (C-2) is satisfied.

When the condition for quitting WGV diagnosis is satisfied (YES in S15), HVECU 62 sets in S16, traveling control of the vehicle back to normal traveling control from traveling control during diagnosis (S13) described previously. WGV diagnosis thus ends. Thereafter, HVECU 62 determines in S171 whether or not diagnosis as being in the abnormal condition has been made in WGV diagnosis.

When an abnormal condition is found in WGV diagnosis, determination as being in the abnormal condition (YES) is made in S171 and the process proceeds to S181. In S181, HVECU 62 performs prescribed processing for the abnormal condition. In the embodiment, in S181, HVECU 62 has storage 62c record a readiness code indicating that WGV diagnosis was appropriately made, a DTC indicating that an abnormal condition was found in WGV diagnosis, and freeze frame data (for example, detection values from various sensors when the abnormal condition was detected), and notifies a user of occurrence of the abnormal condition through notification apparatus 90. HVECU 62 notifies the user of occurrence of the abnormal condition in WGV apparatus 500, for example, by turning on the MIL for WGV diagnosis.

When no abnormal condition has been found in WGV diagnosis (including abortion of WGV diagnosis), it is determined in S171 that no abnormal condition has been found (NO) and the process proceeds to S172. HVECU 62 determines in S172 whether or not WGV diagnosis has been aborted. When WGV diagnosis has been quitted without being aborted (NO in S172), a series of processing in FIG. 8 is quitted after processing in S182 is performed, and when WGV diagnosis has been aborted (YES in S172), the series of processing in FIG. 8 is quitted without processing in S182 being performed.

In S182, HVECU 62 performs prescribed processing for a normal condition. In the embodiment, in S182, HVECU 62 has storage 62c record a readiness code indicating that WGV diagnosis was appropriately made.

FIG. 10 is a diagram for illustrating an operation by the hybrid vehicle according to the embodiment. In FIG. 10, "WGV instruction" represents an instruction from HVECU 62 to WGV actuator 530 (FIG. 3). "Planetary gear output" represents torque output from planetary gear mechanism 20 (FIG. 1) (that is, torque output to output gear 21). "MG1 torque" represents torque of MG 14 and "MG2 torque" represents torque of MG 15.

Referring to FIG. 10 together with FIGS. 1 and 8, in this example, the condition (S11) for making WGV diagnosis described previously is satisfied at timing t1, and combustion in engine 13 is stopped (S12) and motoring (S13) is performed. HVECU 62 controls MGs 14 and 15 in coordination to perform motoring of engine 13 (solid lines L21, L31, and L61). As combustion in engine 13 is stopped, torque output from planetary gear mechanism 20 is lowered (solid line L21). In the example in FIG. 10, motoring is performed for a period from t1 to t3. For the period from t1 to t3, MG 14 is controlled to maintain the rotation speed of engine 13 constant (a line L50) and MG 15 is controlled to maintain traveling torque applied to drive wheel 24 (FIG. 1) of the vehicle constant (a line L40).

As shown with a line L10, at timing t2, HVECU 62 gives an instruction to drive WGV 520 to open to WGV actuator 530. When WGV 520 operates as instructed, opening of WGV 520 becomes larger and engine load is lowered so that torque of MG 14 is lowered (solid line L61) and torque output from planetary gear mechanism 20 is lowered (solid line L21). Torque of MG 14 is lowered to magnitude which indicates that WGV 520 is fully open. Torque of MG 15, on the other hand, increases for maintaining traveling torque of the vehicle (solid line L31). In this case, HVECU 62 diagnoses WGV 520 as having operated as instructed (that is, WGV 520 being normally controllable) based on a behavior of torque of MG 14 as above. In the example in FIG. 10, the condition for quitting WGV diagnosis (S15) is satisfied at timing t3 and transition back to normal traveling control is made (S16). When data indicating soundness of WGV control is obtained at timing t2, however, the condition for quitting WGV diagnosis may be satisfied at timing t2.

When WGV 520 does not react to the drive instruction from HVECU 62, as shown with dashed lines L22, L32, and L62, torque of MG 14 (and torque output from planetary gear mechanism 20 and torque of MG 15) is not varied. When torque of MG 14 does not react in spite of lapse of a prescribed time period since issuance of the instruction from HVECU 62 to WGV actuator 530 (for example, even when timing t3 has come), HVECU 62 diagnoses WGV 520 as not having operated as instructed (that is, WGV 520 not being normally controllable).

In the hybrid vehicle according to the embodiment, the rotation shaft (rotor shaft 23) of MG 14, the rotation shaft (rotor shaft 30) of MG 15, and output shaft 22 of engine 13 are mechanically coupled to one another with planetary gear mechanism 20 (that is, the planetary gear) being interposed (see FIG. 1). Planetary gear mechanism 20 and MG 15 are configured such that motive power output from planetary gear mechanism 20 (that is, motive power output to output gear 21) and motive power output from MG 15 are transmitted to drive wheel 24 as being combined (see FIG. 1). HVECU 62 makes WGV diagnosis (S14 in FIG. 8) for diagnosing whether or not WGV 520 can normally be controlled by issuing an instruction to WGV actuator 530 while it stops combustion in engine 13 (S12 in FIG. 8) and controls MGs 14 and 15 in coordination to perform motoring of engine 13 (S13 in FIG. 8) during traveling of the hybrid vehicle. Therefore, MG 15 compensates for excess or insufficiency in traveling torque while WGV diagnosis is being made, so that good drivability is maintained in the vehicle that is traveling. While WGV diagnosis is being made, fuel for engine 13 is not consumed. According to the hybrid vehicle, soundness of WGV control can be diagnosed while good drivability and fuel consumption rate are maintained during traveling.

HVECU 62 of the hybrid vehicle according to the embodiment performs a method of diagnosing an abnormal condition of the hybrid vehicle including steps A to C described below.

In step A, HVECU 62 determines whether or not a prescribed execution condition is satisfied during traveling of the hybrid vehicle (S11 in FIG. 8).

In step B, when HVECU 62 determines that the execution condition has been satisfied (YES in S11 in FIG. 8), HVECU 62 makes WGV diagnosis (S14 in FIG. 8) for diagnosing whether or not WGV 520 is normally controllable by issuing an instruction to WGV actuator 530 while HVECU 62 stops combustion in engine 13 and controls MGs 14 and 15 in coordination to perform motoring of engine 13 (S12 and S13 in FIG. 8).

In step C, when a prescribed quitting condition is satisfied (YES in S15 in FIG. 8) while HVECU 62 is making WGV diagnosis, HVECU 62 quits WGV diagnosis (S16 in FIG. 8).

According to the method, soundness of WGV control can be diagnosed while good drivability and fuel consumption rate are maintained during traveling of the hybrid vehicle.

In the embodiment, HVECU 62 diagnoses WGV apparatus 500 as being in the abnormal condition when it could not normally control WGV 520 within one trip. Without being limited as such, HVECU 62 may diagnosis WGV apparatus 500 as being in the abnormal condition when it could not normally control WGV 520 consecutively in a prescribed number of trips (for example, two trips).

The execution condition and the quitting condition shown in the embodiment are merely by way of example. Each of the execution condition and the quitting condition can be modified as appropriate. Each of the execution condition and the quitting condition may be fixed or variable depending on a situation. At least one of the execution condition and the quitting condition may be modified by a user. It is not essential to set priority for each diagnosis in HVECU 62. HVECU 62 may make only WGV diagnosis.

In the embodiment, though whether or not WGV 520 has operated as instructed is diagnosed based on a behavior of torque (that is, adjustment torque) of MG 14 at the time of issuance of an instruction by HVECU 62 to WGV actuator 530 in WGV diagnosis (S14 in FIG. 8), a method of WGV diagnosis is not limited thereto. For example, HVECU 62 may diagnose whether or not WGV 520 has operated as instructed, based on a behavior of at least one of a boost pressure detected by boost pressure sensor 72 and a flow rate of intake air detected by air flow meter 50. As opening of WGV 520 is larger, the flow rate of intake air of engine 13 decreases and the boost pressure of engine 13 is lowered. HVECU 62 can diagnose whether or not WGV 520 has operated as instructed, by checking how at least one of the boost pressure and the flow rate of intake air has been varied at the time of issuance of the instruction to WGV actuator 530. Though each of air flow meter 50 and boost pressure sensor 72 is a sensor employed in engine control of a vehicle, a sensor for diagnosis may be provided separately therefrom. A sensor provided for obtaining data to be used for diagnosis (for example, at least one of a boost pressure and a flow rate of intake air) may be used in WGV diagnosis instead of air flow meter 50 and boost pressure sensor 72.

In the embodiment, HVECU 62 can be connected to scan tool 92 and scan tool 92 can read diagnosis data accumulated in HVECU 62 through WGV diagnosis (see FIG. 7). The method of obtaining diagnosis data from HVECU 62, however, is not limited to such a method. For example, HVECU 62 can transmit diagnosis data obtained in WGV diagnosis through wireless communication. HVECU 62 may transmit diagnosis data periodically or in response to an external request. HVECU 62 may transmit diagnosis data, for example, through short-range wireless communication to a portable device (for example, a smartphone) in or around the vehicle. HVECU 62 may transmit diagnosis data, for example, to a terminal of a supervisory authority through long-range wireless communication.

In the embodiment, though HVECU 62 performs both of issuance of a notification about occurrence of an abnormal condition and making records that an abnormal condition has occurred when an abnormal condition is found in WGV diagnosis, HVECU 62 may perform only one of issuance of the notification and making records.

The configuration of engine 13 is not limited to the configuration shown in FIG. 2 and can be modified as appropriate. For example, throttle valve 49 may be provided between air flow meter 50 and compressor 48 in intake air passage 41. A layout of the cylinders is not limited to the in-line layout either, and may be a V layout or a horizontal layout. The number of cylinders and valves can also arbitrarily be modified.

WGV 520 is not limited to a normally closed valve but may be a normally open valve. In the embodiment, HVECU 62 diagnoses whether or not WGV 520 has opened as instructed, by issuing an instruction to drive WGV 520 to open to WGV actuator 530 while the vehicle is traveling with forced induction of engine 13 being performed (that is, with WGV 520 being closed). HVECU 62, however, may diagnose whether or not WGV 520 has closed as instructed, by issuing an instruction to drive WGV 520 to close to WGV actuator 530 while the vehicle is traveling with forced induction of engine 13 not being performed (that is, with WGV 520 being open).

In the embodiment, binary control such as on and off of forced induction (that is, a high boost pressure and a low boost pressure) is carried out. HVECU 62, however, may regulate a boost pressure to desired magnitude by continuously controlling the position of WGV 520 within a range from a fully closed position to a fully open position. An electromagnetic valve capable of continuously varying in position within a range from the fully closed position to the fully opened position may be adopted as negative pressure regulation valve 532 so that magnitude of a negative pressure to be applied to diaphragm 531 can continuously be regulated. In the configuration shown in FIG. 2, negative pressure regulation valve 532 does not have to be provided and an electric pump may be adopted as negative pressure pump 533. HVECU 62 may regulate magnitude of a negative pressure to be applied to diaphragm 531 by controlling an amount of drive of the electric pump. A scheme for driving WGV 520 is not limited to a negative pressure but any scheme is applicable.

A gasoline engine is adopted as engine 13 in the embodiment. Without being limited as such, any internal combustion engine can be adopted as engine 13 and a diesel engine can also be adopted.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:
1. A hybrid vehicle comprising:
a drive wheel;
a planetary gear;
an engine, a first motor generator, and a second motor generator mechanically coupled to the drive wheel; and
a controller that controls the engine, the first motor generator, and the second motor generator,
the engine including
an engine main body where combustion is performed,
an intake air passage and an exhaust passage connected to the engine main body,
a turbocharger,
a bypass passage connected to the exhaust passage,
a waste gate valve provided in the bypass passage, and
a WGV actuator that drives the waste gate valve,
the turbocharger including
a compressor provided in the intake air passage, and
a turbine provided in the exhaust passage, the compressor and the turbine being rotated together,
the bypass passage allowing exhaust to flow as bypassing the turbine,
each of the engine and the first motor generator being mechanically coupled to the drive wheel with the planetary gear being interposed,
the planetary gear and the second motor generator being configured such that motive power output from the planetary gear and motive power output from the second motor generator are transmitted to the drive wheel as being combined, wherein
the controller makes WGV diagnosis for diagnosing whether the waste gate valve is normally controllable by issuing an instruction to the WGV actuator while the controller stops the combustion in the engine and controls the first motor generator and the second motor generator in coordination to perform motoring of the engine by the first motor generator and the second motor generator during traveling of the hybrid vehicle,
when an abnormal condition is determined by the WGV diagnosis during traveling of the hybrid vehicle, the controller records information indicating that the abnormal condition was determined by the WGV diagnosis, while the WGV diagnosis is being made, the controller controls the second motor generator to generate traveling torque for traveling of the hybrid vehicle and controls the first motor generator to generate adjustment torque for maintaining a rotation speed of the engine constant, and in the WGV diagnosis, the controller diagnoses whether the waste gate valve has operated as instructed, based on a behavior of the adjustment torque at time of issuance of the instruction to the WGV actuator.

2. The hybrid vehicle according to claim 1, wherein
the controller includes a processor and a storage in which a diagnosis program and priority for each type of diagnosis are stored,
the processor makes a plurality of types of diagnosis in accordance with the priority by executing the diagnosis program,
the plurality of types of diagnosis include the WGV diagnosis and MG diagnosis, the MG diagnosis being diagnosis as to whether the first motor generator and the second motor generator are normally controllable, and
the WGV diagnosis is higher in priority than the MG diagnosis.

3. The hybrid vehicle according to claim 2, wherein
when the controller makes the plurality of types of diagnosis and diagnoses the hybrid vehicle as being in an abnormal condition, the controller causes the storage to record a diagnostic trouble code representing a location of a failure and details of the failure, and when a function to diagnose a diagnosis item is normally performed, the controller causes the storage to record a readiness code corresponding to the diagnosis item, the readiness code representing whether or not a function to diagnose each diagnosis item is appropriately performed.

4. The hybrid vehicle according to claim 1, wherein
the WGV actuator includes a diaphragm, a negative pressure regulation valve, and a negative pressure pump,
the diaphragm is coupled to the waste gate valve and the waste gate valve is driven by a negative pressure introduced into the diaphragm,
the negative pressure pump is connected to the diaphragm with the negative pressure regulation valve being interposed between the diaphragm and the negative pressure pump and the negative pressure pump generates the negative pressure, and
the negative pressure regulation valve is configured to regulate magnitude of the negative pressure applied to the diaphragm.

5. The hybrid vehicle according to claim 1, wherein
when no abnormal condition is determined by the WGV diagnosis, the controller determines whether or not the WGV diagnosis has been aborted, and
when the WGV diagnosis has been quitted without being aborted, the controller records information indicating that WGV diagnosis was appropriately made.

6. The hybrid vehicle according to claim 1, wherein
the planetary gear includes
a sun gear coupled to the first motor generator,
a ring gear coupled to the drive wheel, and
a carrier coupled to the engine, and
the planetary gear is configured to transmit torque output from the engine by dividing torque into torque to the sun gear and torque to the ring gear.

* * * * *